United States Patent [19]

Gardner

[11] 4,315,492
[45] Feb. 16, 1982

[54] EGR VALVE CONTROL SIGNAL PROCESSING FOR INTERNAL COMBUSTION ENGINE

[76] Inventor: Conrad O. Gardner, 22905 108th W., Edmonds, Wash. 98020

[21] Appl. No.: 158,811

[22] Filed: Jun. 12, 1980

[51] Int. Cl.³ .................................... F02M 25/06
[52] U.S. Cl. .................................... 123/571; 123/568; 123/625; 123/406; 123/626; 123/407
[58] Field of Search ............... 123/568, 571, 625, 626, 123/602, 612, 613, 614, 615, 616, 617, 406, 407, 408, 409, 410, 411

[56] References Cited

U.S. PATENT DOCUMENTS

| | | | |
|---|---|---|---|
| 3,788,284 | 1/1974 | Gardner | 123/571 |
| 4,124,006 | 11/1978 | Rodenkirch | 123/568 |
| 4,191,144 | 3/1980 | Nohira et al. | 123/571 |
| 4,19 1,147 | 3/1980 | Yuuki | 123/407 |

Primary Examiner—Wendell E. Burns
Attorney, Agent, or Firm—M. A. Case

[57] ABSTRACT

An EGR valve control signal developed by the EGR modulator circuit for controlling the EGR valve is combined in a feedback loop with a signal representative of an engine combustion condition, e.g. engine knock to modify ignition timing through advance or retard.

7 Claims, 1 Drawing Figure

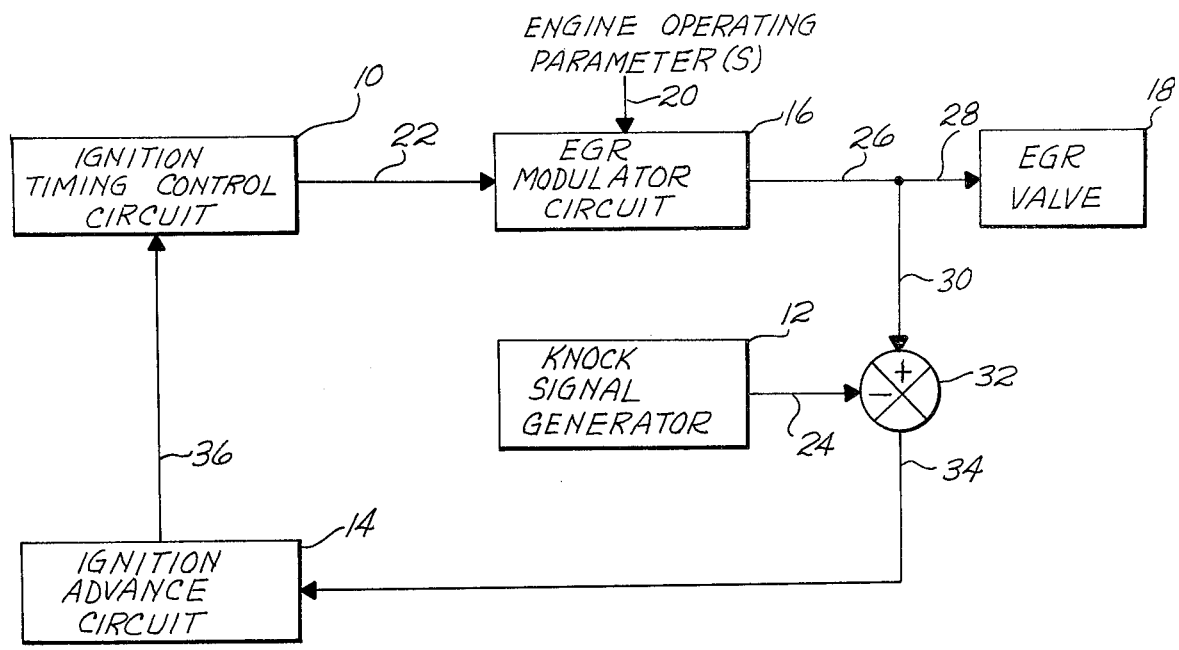

EGR VALVE CONTROL SIGNAL PROCESSING FOR INTERNAL COMBUSTION ENGINE

This invention relates to exhaust gas recirculation (EGR) in internal combustion engines and more particularly to utilization of a modulator circuit developed EGR valve control signal for both controlling the EGR valve and in feedback with a further signal for modifying ignition timing.

Heretofore, EGR modulator circuits responsive to engine operating parameter(s), e.g. throttle and controlled to provide rapid periodic update by timing means such as a pulse source have been known in the patent literature, e.g. as shown in my U.S. Pat. No. 3,788,284 issued Jan. 29, 1974.

Emission control systems such as shown in U.S. Pat. No. 4,124,006 issued Nov. 7, 1978 show ignition timing advance as a function of increases in a port vacuum level. U.S. Pat. No. 4,191,147 issued Mar. 4, 1980 shows vacuum advancing of ignition timing in relation to EGR control.

Turning now to electronic signal processing concepts rather than the above-mentioned vacuum based ignition timing control, it can be seen in U.S. Pat. No. 4,191,144 issued Mar. 4, 1980 how an EGR related signal (based on an EGR ratio) is developed to control spark advance angle.

The above vacuum or electronic control of ignition timing advance based on EGR is based upon either experimental and/or theoretical considerations to achieve the desired rate of advance in engine timing.

In actual operation, internal combustion engines have included monitoring systems for monitoring engine combustion conditions. In U.S. Pat. No. 4,111,035 issued Sept. 5, 1978, an electronic signal processing system is shown for deriving an engine knock signal to retard spark timing, and in U.S. Pat. No. 4,186,701, an ionic current is utilized as a basis in providing feedback control of the volume of recirculated exhaust gas.

It is accordingly an object of the present invention to provide for subtraction in a feedback loop of a signal representative of condition representative of an engine combustion condition from an EGR related signal to provide a third signal for advancing or retarding ignition timing thereby relating the amount of timing advance due to EGR increase to instantaneous engine combustion conditions and not previously calculated or theoretically optimum value.

It is yet another object of this invention to provide means for combining signals representative of EGR conditions and actual engine combustion condition to affect ignition timing control.

It is still another object of this invention to provide means for generating a signal for modifying ignition timing based upon a first signal representative of a condition internal to the internal combustion engine and exhaust system and a second signal representative of a condition of operation of the engine in response to control thereof.

Other objects of this invention will become more apparent upon reference to the succeeding detailed description thereof, and to the drawings illustrating a preferred embodiment thereof; wherein, FIG. 1 is a block diagram illustrative of a preferred embodiment of the present EGR feedback control system for controlling ignition timing.

Turning now to FIG. 1, it can be seen that elements 10, 16, and 18 illustrative of a modulator circuit responsive to an engine operating parameter to provide EGR valve 18 control and which modulator circuits are continuously updated by a pulse source 10 are seen in e.g. hereinbefore referenced U.S. Pat. No. 3,788,284. In such a system the modulator output signal 26 is utilized as an EGR valve control signal 28 for operating EGR valve means 18. However, in the present system of FIG. 1, an EGR related signal 30 (here dependent upon the amplitude of EGR valve control signal 28 representative of the commanded amount of EGR) is coupled to combining circuit means 32 with a signal 24 representative of an engine combustion condition. Combining circuit means 32 provides for subtraction of signal 24 from signal 30 to provide a third signal 34. Where the amplitude of signal 30 (conditioned to provide e.g. the equivalent of about one degree by crank angle per 1% of exhaust gas recirculation) is greater than the amplitude of signal 24, then a signal with positive reference representative of ignition advance causes ignition advance circuit 14 to generate an ignition advance signal 36 for modifying ignition timing control circuit 10 of an internal combustion engine. Where signal 24 representative of an engine combustion condition (knock as shown in the system of FIG. 1) is in contrast of greater amplitude than signal 30 then third signal 34 is of negative reference value causing a negative ignition advance or retard signal 36 to be generated by ignition advance circuit 14. Knock signal generator circuit 12 may comprise the generator circuit of aforementioned U.S. Pat. No. 4,111,035 or another circuit which can provide an output signal 24 representative of an engine combustion condition e.g. an ionic current generator in the combustion chamber such as shown in aforementioned U.S. Pat. No. 4,186,701 when appropriate signal conditioning is provided. The present feedback loop is seen to provide ignition advance of about one degree by crank angle per 1% of exhaust gas recirculation under the influence of EGR based signal 30 alone until the advance becomes retarded by an increase of signal 24 representative of an increased undesired engine combustion condition viz. increased amplitude knock. Increased signal 24 representative of increased knock results (when of greater amplitude than signal 30 to subtractor circuit 32) in a minus polarity third signal 34 resulting in an ignition retard command signal 36 to ignition timing control circuit 10 of the internal combustion engine (not shown).

The advantages of EGR and ignition timing advance and simultaneous control thereof provide efficient control of emissions and good engine operation. The advantages of EGR being well recognized has led to proposed designs which include e.g. EGR rates of up to about 40%, an amount greatly exceeding that incorporated in current motor vehicles which leads to a closer control requirement for EGR and consequent more precision control requirements. As a consequence, in accordance with the present system embodiment herein disclosed, it can be seen that tendencies toward loss of stability (more likely to occur with increase in EGR) in real world operation of the engine are utilized in feedback loop control to more closely control ignition timing advance already under the control of EGR.

I claim:

1. A method for controlling ignition timing in an internal combustion engine having ignition timing control system and an exhaust gas recirculation device, said method comprising the steps of:

provide a first signal responsive to exhaust gas recirculation:

providing a second signal responsive to an engine combustion condition;

circuit means responsive to said first and second signals for providing a third signal; and, ignition advance circuit means responsive to said third signal for affecting the timing of said ignition timing control circuit.

2. The invention according to claim 1 wherein said first signal comprises an exhaust gas recirculation valve control signal for controlling said exhaust gas recirculating device.

3. The invention according to claim 1 wherein said second signal comprises a signal representative of engine knock.

4. An EGR/ignition timing control system for an internal combustion engine having an ignition control system and an EGR modulator circuit for generating an EGR valve control signal, said EGR/ignition timing control system further comprising in combination:

means for providing a signal representative of an engine combustion condition;

circuit means responsive to said EGR valve control signal and said signal representative of an engine combustion condition for providing a further signal; and, means responsive to said further signal for controlling ignition timing of said ignition timing control system.

5. Th system of claim 3 wherein said means for providing a signal representative of an engine combustion condition comprises a knock signal generator.

6. The system of claim 3 wherein said circuit means responsive to said EGR valve control signal and said signal representative of an engine combustion condition comprises a subtractor circuit for subtracting said signal representative of an engine combustion condition from said EGR valve control signal.

7. In combination with a feedback control system for controlling the volume of exhaust gas recirculated from an exhaust passage of an internal combustion engine to the induction passage of the engine through an electrically operated exhaust gas recirculation valve:

means for providing an exhaust gas recirculation valve control signal for controlling said electrically operated exhaust gas recirculation valve;

means for providing a signal representative of an engine combustion condition;

means responsive to said exhaust gas recirculation valve control signal and said signal representative of an engine combustion condition for providing a further signal; and, utilization means responsive to said third signal.

* * * * *